(12) United States Patent
Kato

(10) Patent No.: US 7,227,656 B1
(45) Date of Patent: Jun. 5, 2007

(54) MANAGEMENT DEVICE AND METHOD OF PRINT SYSTEM FOR UPDATING SOFTWARE PROGRAMS INSTALLED IN THE PRINT SYSTEM

(75) Inventor: Takeshi Kato, Kawasaki (JP)

(73) Assignee: Minolta Co., Ltd., Osaka (JP)

( * ) Notice: Subject to any disclaimer, the term of this patent is extended or adjusted under 35 U.S.C. 154(b) by 609 days.

(21) Appl. No.: 09/616,883

(22) Filed: Jul. 14, 2000

(30) Foreign Application Priority Data

Jul. 14, 1999 (JP) ................................ 11-200263

(51) Int. Cl.
*G06F 15/00* (2006.01)
*H04M 3/22* (2006.01)

(52) U.S. Cl. ..................... 358/1.15; 358/1.15; 358/1.1; 379/9.01

(58) Field of Classification Search ............... 358/1.15, 358/1.1, 1.9, 1.11–1.14, 1.16–1.18; 711/103, 711/104, 133, 159, 165; 703/22; 710/104; 379/9.01; 717/101, 120, 121
See application file for complete search history.

(56) References Cited

U.S. PATENT DOCUMENTS

| | | | | |
|---|---|---|---|---|
| 5,499,357 A | * | 3/1996 | Sonty et al. | 710/104 |
| 5,580,177 A | * | 12/1996 | Gase et al. | 400/61 |
| 5,740,405 A | * | 4/1998 | DeGraaf | 703/22 |
| 6,113,208 A | * | 9/2000 | Benjamin et al. | 347/7 |
| 6,363,402 B1 | * | 3/2002 | Matsuura | 707/203 |
| 6,438,643 B1 | * | 8/2002 | Ohara et al. | 711/103 |
| 6,631,008 B2 | * | 10/2003 | Aoki | 358/1.15 |

FOREIGN PATENT DOCUMENTS

| | | |
|---|---|---|
| JP | 6-332674 | 12/1994 |
| JP | 8-249138 | 9/1996 |
| JP | 10-340163 | 12/1998 |

OTHER PUBLICATIONS

Translation of Notice of Final Rejection dated Mar. 20, 2003 in corresponding Japanese application 11-200263.

* cited by examiner

*Primary Examiner*—Gabriel Garcia
*Assistant Examiner*—Thierry L. Pham
(74) *Attorney, Agent, or Firm*—Morrison & Foerster LLP

(57) ABSTRACT

This invention provides a management device and method for managing a update of software programs having functionally close relations each other installed in a print system, such as a printer driver and a control program. In the print system comprising a host computer and a printer for receiving and printing a print job from the host computer, provided is adaptability information indicative of adaptability between control programs and printer drivers in several versions. With reference to the adaptability information, it is determined that adaptability between the printer driver and the control program which have already been installed, and newer versions of printer driver and the control program. When those software programs have the adaptability therebetween, the printer driver and the control program which have already been installed are updated to have the newer versions.

42 Claims, 3 Drawing Sheets

MANAGEMENT DEVICE AND METHOD OF PRINT SYSTEM FOR UPDATING SOFTWARE PROGRAMS INSTALLED IN THE PRINT SYSTEM

This application is based on application No. 11-200263 filed in Japan, the contents of which is incorporated herein by reference.

BACKGROUND OF THE INVENTION

1. Field of the Invention

The present invention relates to a management device and method for a print system comprising a data processor and a printer for printing a print job sent from the data processor, and more particularly to management of update process of software programs installed in the print system.

2. Description of the Related Art

In recent years, office automation has been promoted in enterprise offices and a print system through a network has been spread with the development of an information processing apparatus. More specifically, there has been a system in which a plurality of host computers are connected to a printer through a network such as a LAN and a print job sent from the host computer is printed and output from the printer.

In such a print system, a software program adapted to a printer and generating a print job, that is, a printer driver is installed in a host computer, and a control program which is a software program for controlling the operation is installed in the printer. The printer driver and the control program have functionally close relations with each other, and therefore it is necessary to install the printer driver functionally adapted to the control program of the printer into the host computer.

The printer driver and the control program which are to be installed in these apparatuses are revised at any time to eliminate drawbacks such as a program bug or extend functions. In general, such revision of a software program is referred to as "version up" and identification indicative of the degree of the revision is referred to as "version".

With the version up of the software program, a user reinstalls a software program having the latest version into the host computer and the printer. Consequently, the user can eliminate the drawbacks and can utilize new functions.

However, the user needs to always observe the version up for each software program, and furthermore, needs to confirm the adaptability of the software program to carry out an install work. These works are a burden to the user.

In order to solve such a problem, Japanese Laid-Open Patent Publication No. 10-340163 has disclosed the art in which the control program of a printer, the software program of personal computer terminals and the like are automatically updated individually. More specifically, there has been disclosed a method for downloading a software program through a network to carry out version up.

In two or more software programs having functionally close relations, however, even if one of the software programs is updated, effects cannot be obtained or a normal operation cannot be carried out if the other software program is not updated. In the conventional invention, such software programs having functionally close relations have not been taken into consideration and cannot cope with the above-mentioned problem.

SUMMARY OF THE INVENTION

The present invention has been made to solve the above-mentioned problem and has an object to provide a print system for automatically updating a software program while holding consistency or conformity between the software programs in which the software programs having functionally close relations are installed. Moreover, the present invention provides a print system having a non-adaptable software program installed therein for some reason (for example, in the case in which a data processor on a network is replaced with another one or the case in which the user installs a non-adaptable software program by mistake) wherein the user is informed of the non-adaptability or access to a printer is rejected to previously prevent the generation of troubles due to the non-adaptability of the software program.

In a first aspect of the invention, provided is a management device for managing a print system comprising a data processor connected to a network and a printer for executing a print job sent from the data processor via the network. The data processor has a first software program installed therein and the printer has a second software program installed therein.

The management device comprises determining controller for determining adaptability between old version and new version for the first software program and the second software program installed in the data processor and the printer, and updating controller for executing a predetermined process to update the first and the second software programs on the data processor and the printer based on the determination result by the determining controller.

In the device, the updating controller may update the first software program and the second software program in a predetermined order which is defined based on the determination result by the determining controller.

When the determining controller determines that there is no adaptability between the new version of the first software program and the old version of the second software program, the updating controller may update first the second software program and then updates the first software program.

When the determining controller determines that there is no adaptability between the new version of the second software program and the old version of the first software program, the updating controller may update first the first software program and then updates the second software program.

The updating controller may control execution and prohibition of update of the first and the second software programs based on the determination result by the determining controller.

The updating controller may prohibit the first software program already installed from being updated, when the determining controller determines that the new version of the first software program is not adaptable to neither of the new version of the second software program and the old version of the second software program.

The updating controller may prohibit the second software program already installed from being updated, when the determining controller determines that the new version of the second software program is not adaptable to neither the new version or the old version of the first software program.

The updating controller may send a message which prompts update of the first and the second software programs to the data processor to display the message, based on the determination result by the determining controller.

The device may further comprise a memory for storing information about the adaptability between new version and old version for the first software program and the second software program, wherein the determining controller downloads the information about the adaptability via the network into the memory to determine the adaptability based on the downloaded information.

In the device, the device may be incorporated in the printer.

The updating controller may receive information about the version of the first software program installed in the data processor, as well as the print job sent from the data processor, and executes a predetermined process based on the received information about the version.

The updating controller may also execute the predetermined process to the other data processor, when the other data processor is connected to the network.

The first software program may control the data processor to generate a print job corresponding to the printer, and the second software program may control the printer to execute the print job generated by the first software program.

In a second aspect of the invention, provided is a management device for managing a print system comprising a data processor and a printer for executing a print job sent from the data processor. The data processor has a first software program installed therein, and the printer has a second software program installed therein. The management device can be connected to a network, especially a wide area network such as Internet). The device comprises determining controller for determining adaptability between old version and new version for the first software program and the second software program based on adaptability information that is obtained via the network, and updating controller for executing a predetermined process to update the installed first software program and the installed second software program based on the determination result by the determining controller.

According to the management device and method of the present invention, in a print system in which software programs having functionally close relations are installed, a software program is automatically updated to upper version such that functional consistency between the software programs is kept. Consequently, it is possible to rapidly cope with drawbacks caused by version inconsistency between a plurality of software programs, and further to use effectively the extended function and performance. Thus, a complicated work for the user with the version up can be eliminated to reduce user's burden.

This object as well as other objects, features and advantages of the invention will become more apparent to those skilled in the art from the following description with reference to the accompanying drawings.

DETAILED DESCRIPTION OF THE PREFERRED EMBODIMENT

A preferred embodiment of a print system according to the present invention will be described below in detail with reference to the accompanying drawings. The following print system installs software programs having close relations each other in an operation such as the control program of a printer and the printer driver of a host computer. When the update of the versions of the software programs is confirmed or one of the software programs is installed, the version up of the related software program is carried out in the whole print system. Consequently, it is possible to carry out the version up while holding matching between the related software programs in the whole print system. Thus, the burden of the user can be reduced. This will be described below in detail.

Figure 1:
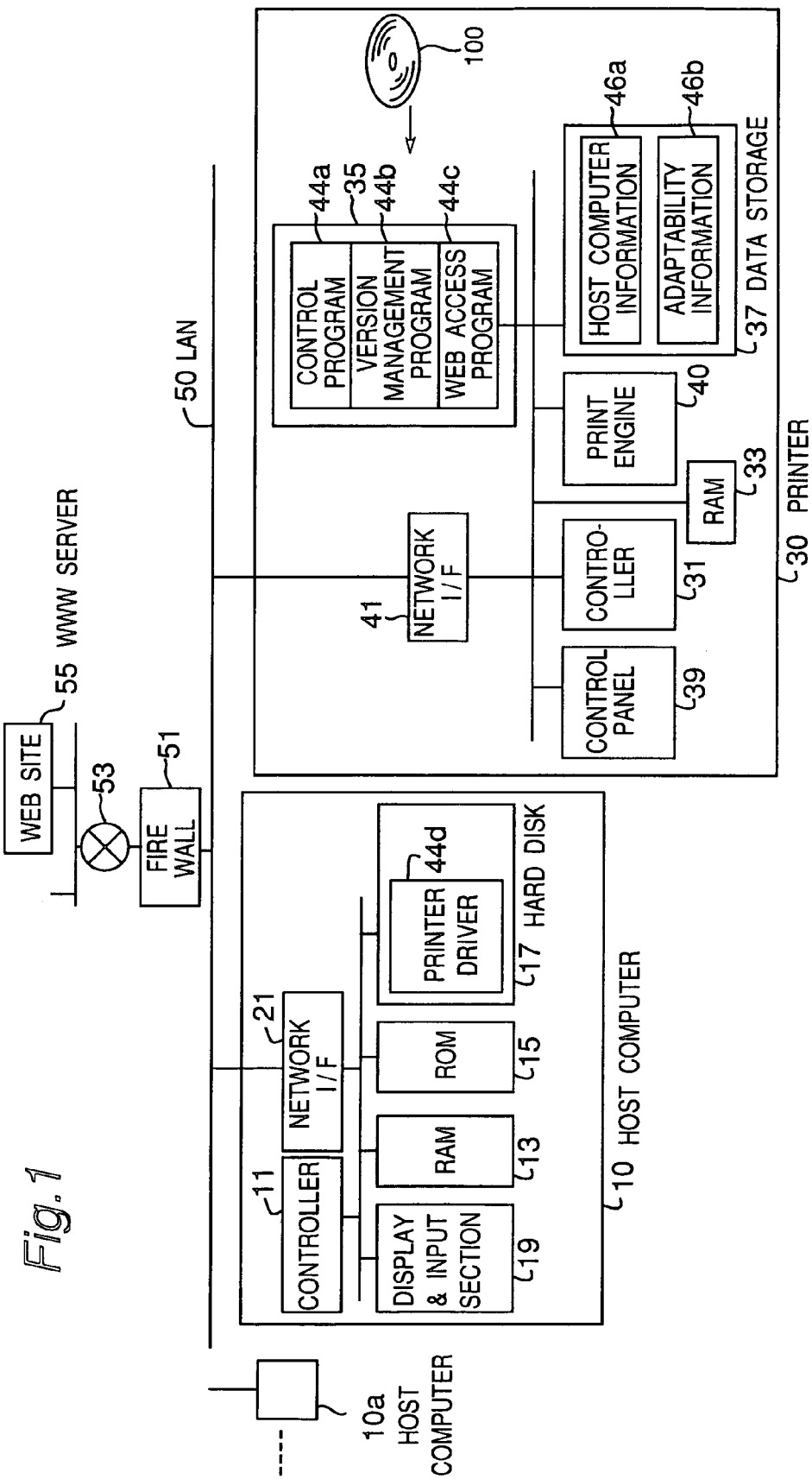
FIG. 1 is a diagram showing the construction of a print system according to the present invention.

FIG. 1 shows a construction of a print system according to the present invention. As shown in FIG. 1, the print system comprises a host computer 10a which is a data processing apparatus and a printer 30 for printing and outputting a print job transmitted from the host computer 10, 10a . . . . The host computer 10 and the printer 30 are connected to each other through a network 50 such as a LAN (local area network). A plurality of host computers 10a . . . is connected to the network 50 in addition to the host computer 10, and the printer 30 is shared by a plurality of host computers. The printer 30 receives print jobs from the host computers 10, 10a . . . connected to the network 50, and prints the jobs out.

The host computer 10 has a controller 11 for controlling the operation of the host computer 10, a RAM 13 for temporarily storing a program which is referenced and executed by the controller 11, a ROM 15 for storing a predetermined program, a hard disk unit 17 for storing various data and programs, a display and input section 19 for carrying out display and input operations, and a network interface 21 for exchanging data with the network 50. In the host computer 10 having such a construction, the controller 11 reads a predetermined program stored in the ROM 15 or the hard disk unit 17, temporarily stores the program to the RAM 13, and then executes the program stored in the RAM 13 to implement a predetermined function and operation.

On the other hand, the printer 30 has a controller 31 for controlling the operation of the printer 30, a RAM 33 for temporarily storing a program to which reference is to be made during execution by the controller 31, a memory 35 for storing a predetermined program or the like which is executed by the controller 31, a data storage 37 to be auxiliary storage means for storing various data and programs and the like, an control panel 39 for carrying out display and input operations, a print engine 40 for implementing print process, and a network interface 41 for exchanging data with the network 50. The memory 35 has a writable ROM such as a flush ROM. In the printer 30 having such a construction, the controller 31 reads a control program 44a out from the memory 35 to temporarily store the control program 44a into the RAM 33, and then reads the control program 44a from the RAM 33 to execute the read program, thereby implementing a predetermined function and operation.

In the print system, the host computer 10 outputs a print job to the printer 30 through the network 50. For this operation, a printer driver 44d which is a software program for creating data of the print job having the form which can be processed by the printer 30 is installed in the host computer 10. The printer driver 44d has the functional close relations with the control program 44a which controls the operation of the printer 30. More specifically, the printer driver 44d having a version suitable for or adaptable to the control program 44a in an operation should be installed in the host computer 10.

The network 50 is connected to an external wide area network 53, for example, a so-called Internet through a firewall 51 for maintaining security. The print system can give access to a WWW server 55 having a predetermined Web site through the external network 53. The predetermined Web site to which the print system gives access has information about the control program to be installed in the printer 30 and the printer driver to be installed in the host computer 10. The information included on the site is updated at any time to cope with extension of the function and drawbacks for printing operation of the printer. A control program and a printer driver which have the latest version can be downloaded from the site.

The printer 30 has also a version management program 44b for updating process of the control program 44a or the like, and a Web access program 44c for giving access to the predetermined Web site of the Internet to acquire predetermined information, in the memory 35, in addition to the control program 44a. Moreover, the printer 30 has host computer information 46a and adaptability information 46b in the data storage 37. The host computer information 46a includes information about a host computer which uses the printer 30, and information of a software program which is related to a printer and is installed in the host computer (for example, type of the printer driver, version of the printer driver and the like). The adaptability information 46b is information which indicates whether a printer driver having a certain version is adaptable to a control program having a certain version in an operation. Information about the host computer which is included in the host computer information 46a is received in advance from the host computers 10, 10a . . . through the network 50 in the printer 30 and is stored in the data storage 37. The version control program 44b, the WEB access program 44c or other software program which is executed by the controller 31 or 11 may be provided by a computer readable data recording medium 100 such as CD-ROM, DVD-ROM, floppy disc or the like.

The print system according to the present invention has the function of automatically updating the versions of the control program 44a installed in the printer 30 and the printer driver 44d installed in the host computer 10. Description will be given to the control for implementing this version updating function.

Figure 2:
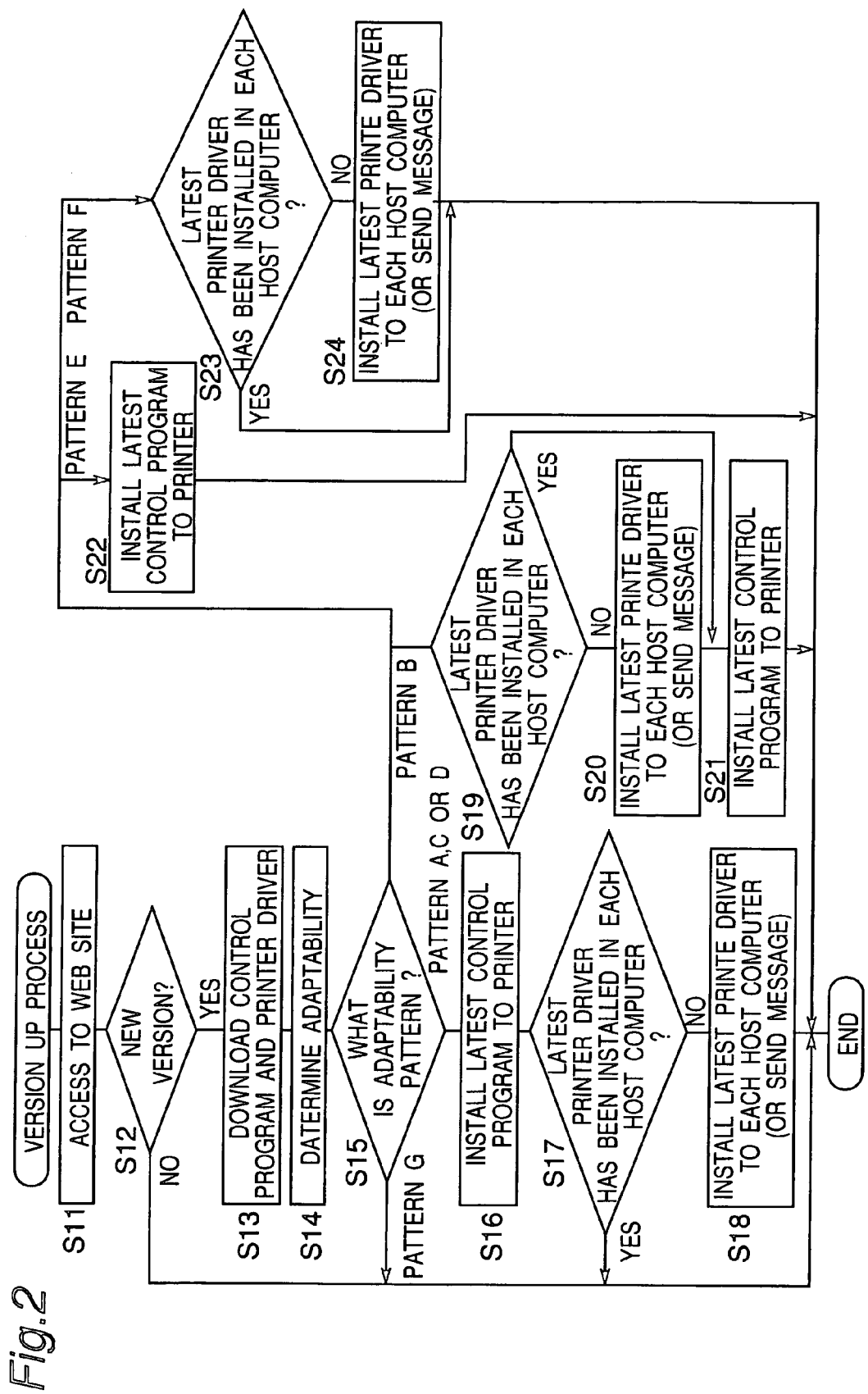
FIG. 2 is a flowchart showing a version-up process of the control program in the printer and the printer driver in the host computer.

FIG. 2 is a flowchart for explaining a version up process for the control program of the printer and the printer driver of the host computer. The present process is carried out periodically (for example, at a specified time during night) and is implemented by the version management program 44b. More specifically, the printer 30 implements a function for executing print jobs sent from a plurality of host computers connected to the network 50 by executing the control program 44a. The printer 30 implements a function for managing the update of version of the control program and the printer driver in the print system by executing the version management program 44b.

The version management program 44b first activates the Web access program 44c incorporated in the printer 30, and gives access to the Web site in which the latest control program 44a for the printer and the latest printer driver 44b are stored (S11). The version management program 44b refers to the predetermined information in the Web site (for example, the printer name and the latest version number), and decides whether the versions of those programs are updated (S12). The decision is carried out by comparing the versions of the control program and the printer driver which are stored in the Web site with the versions of the control program and the printer driver which are currently installed to the host computer 10, 10a . . . or the printer 30. Version of the current printer driver installed in the host computer 10, 10a . . . is notified to the printer 30 by version information which is sent from the host computer 10, 10a . . . with the print job.

As a result of the decision, if the version is updated or changed, the control program and the printer driver which have the latest version are downloaded from the Web site (S13). The downloaded program is temporarily stored in the data storage 37. Then, the version management program 44b refers to the host computer information 46a and the adaptability information 46b, and decides the adaptability of the control program and the printer driver which are currently installed in the printer 30 and the host computer 10 to the printer driver and the control program which have new version (S14, S15). Based on the result of the decision, the control program and the printer driver are installed (S16 to S24).

The decision of the adaptability (S14, S15) will be described below. As described above, the control program and the printer driver have functionally close relations. Therefore, when the printer driver is to be installed, it is necessary to consider whether a printer driver to be installed is adaptable to the control program of a printer to be used.

Therefore, the adaptability information 46b is referenced. The adaptability information 46b indicates whether a printer driver with a certain version is adaptable to a control program with a certain version, that is, whether there are drawbacks in an operation. For example, the adaptability information 46b includes information indicative of a relationship shown in the following Table 1. The Table 1 indicates that the latest printer driver (printer driver (new)) on the WEB is not adaptable or not matched to the control program (control program (current)) which is currently installed to the printer. The Table 1 also indicates that the current printer driver (printer driver (current)) which are currently installed to the host computer is adaptable to the latest control program (control program (new)) on the WEB. Moreover, it is indicated that the latest printer driver is adaptable to the latest control program.

TABLE 1

| | (1) Pattern A | | |
|---|---|---|---|
| | printer driver (new) | printer driver (current) | (Installation Seq.) |
| control program (new) | ○ | ○ | → 1. control program |
| control program (current) | X | ○ | 2. printer driver |

(○ — adaptable, X — not adaptable)

It is supposed that the relationship of the operation adaptability between the control program and the printer driver has patterns shown in Tables 2 to 7 other than the Table 1. Based on the respective patterns, the sequence of installation of the control program and the printer driver or the presence of the installation is determined.

TABLE 2

(2) Pattern B

| | printer driver (new) | printer driver (current) | (Installation Seq.) |
|---|---|---|---|
| control program (new) | ○ | X | → 1. printer driver |
| control program (current) | ○ | ○ | 2. control program |

(○ — adaptable, X — not adaptable)

TABLE 3

(3) Pattern C

| | printer driver (new) | printer driver (current) | (Installation Seq.) |
|---|---|---|---|
| control program (new) | ○ | X | → 1. control program |
| control program (current) | X | ○ | 2. printer driver |

(○ — adaptable, X — not adaptable)

TABLE 4

(4) Pattern D

| | printer driver (new) | printer driver (current) | (Installation Seq.) |
|---|---|---|---|
| control program (new) | ○ | ○ | → 1. control program |
| control program (current) | ○ | ○ | 2. printer driver |

(○ — adaptable, X — not adaptable)

TABLE 5

(5) Pattern E

| | printer driver (new) | printer driver (current) | |
|---|---|---|---|
| control program (new) | X | ○ | → Only control program is installed. |
| control program (current) | X | ○ | |

(○ — adaptable, X — not adaptable)

TABLE 6

(6) Pattern F

| | printer driver (new) | printer driver (current) | |
|---|---|---|---|
| control program (new) | X | X | → Only printer driver is installed. |
| control program (current) | ○ | ○ | |

(○ — adaptable, X — not adaptable)

TABLE 7

(7) Pattern G

| | printer driver (new) | printer driver (current) | |
|---|---|---|---|
| control program (new) | X | X | → No installation |
| control program (current) | X | ○ | |

(○ — adaptable, X — not adaptable)

Returning to FIG. 2, as a result of the decision of the adaptability, the control program having the latest version is first installed in the printer 30 with the adaptability having a pattern A, C or D (S16). More specifically, the control program 44a in the memory 35 is updated. Then, it is decided whether the latest version of the printer driver adaptable to the control program installed in the printer 30 in an operation has already been installed in all the host computers utilizing the printer 30 through the network 50 (S17). This decision is carried out by referring to the host computer information 46a. If the latest version is not installed, the printer driver of the latest version which is adaptable to the control program is installed in the hard disk 17 for the host computer in which the latest version is not installed (S18). At this time, a predetermined message indicating to promote the installation of the printer driver with the latest version may be sent to each host computer in place of the installation of the printer driver. If the latest version of the printer driver has already been installed, the step S18 is skipped and the processing ends. As in the above-mentioned case, when both of the old and new version of the printer drivers are adaptable to the new version of the control program but the control program currently installed is not adaptable to the new version of the printer driver, the current control program having non-adaptability is earlier updated to the latest version. Then, the printer driver having adaptability is updated to the latest version.

When the adaptability pattern is a pattern B, it is decided whether the latest version of the printer driver adaptable to the control program installed in the printer 30 in an operation has already been installed in all the host computers utilizing the printer 30 through the network 50 (S19) If there is at least one host computer in which the latest version of the printer driver is not installed, the latest printer driver adaptable to the control program is installed into the host computer in which the latest printer driver is not installed (S20). At this time, a predetermined message may be given to the host computer 10 instead of the installation. If the latest version has already been installed in each host computer, the step S20 is skipped. Thereafter, the control program having the latest version is installed in the printer 30 (S21) and the processing ends. As in this case, when the control programs in old and new versions have adaptability to the printer driver in new version but the current installed printer driver is not adaptable to the control program in new version, the current printer driver having non-adaptability is updated to be in the latest version prior to the control program. Then, the control program having adaptability is updated to be in the latest version.

When the adaptability pattern is a pattern E, the control program with the latest version is installed in the printer 30

(S22) and the processing ends. In this case, since the control program is not adaptable to the latest printer driver, only the control program is updated.

When the adaptability pattern is a pattern F, it is decided whether the latest version of the printer driver adaptable to the control program installed in the printer 30 in an operation has already been installed in all the host computers utilizing the printer 30 through the network 50 (S23). If the latest version of the printer drivers are not installed to all of the host computers, the latest printer driver adaptable to the control program is installed to the host computer having no latest installed printer driver (S24). Alternatively, a predetermined message may be sent to the host computer 10. If the latest version of the printer driver has already been installed in each host computer, the step S24 is skipped and the processing ends. In this case, the printer driver is not adaptable to the latest control program. Therefore, only the printer driver is updated.

When the adaptability pattern is a pattern G, no installation is carried out and the processing ends. In this case, both of the latest control program and the latest printer driver have no adaptability. Therefore, the control program and the printer driver are not updated.

Figure 3:
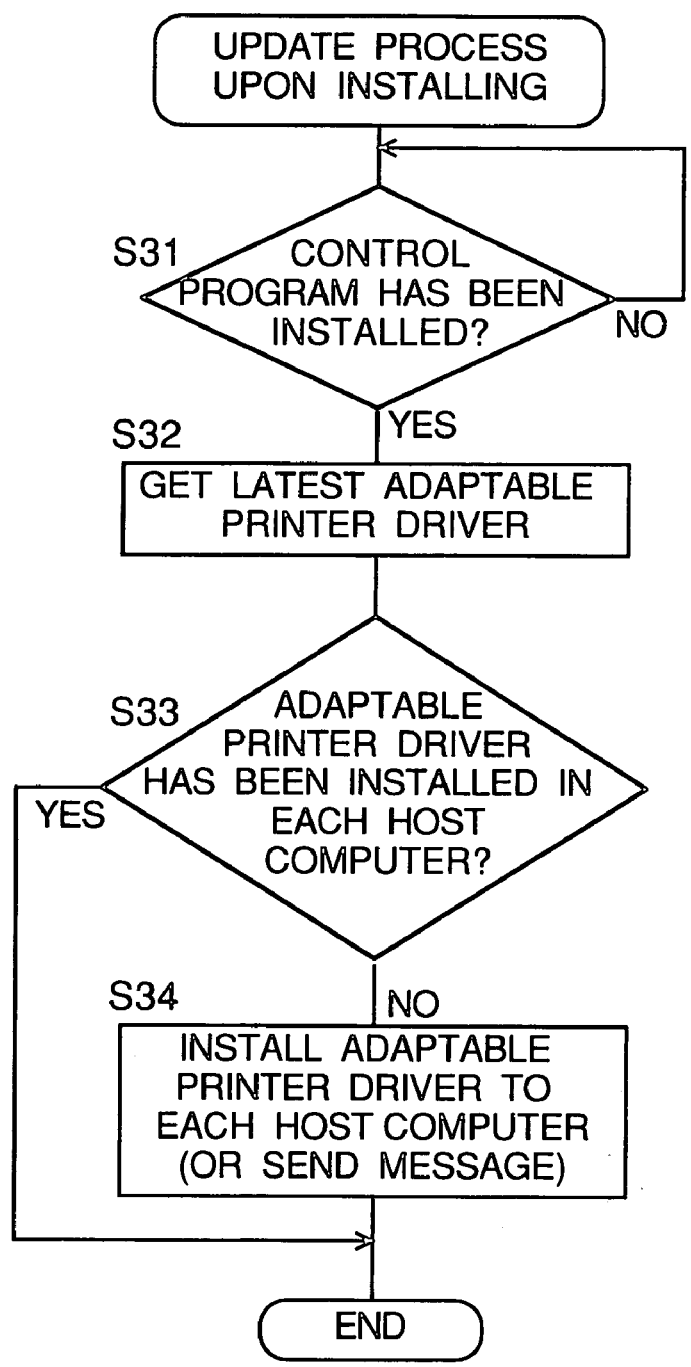
FIG. 3 is a flowchart showing update process of the printer driver installed in the host computer when the control program is installed to the printer.

FIG. 3 is a flowchart of an update process during installation of the latest version of the control program or the printer driver. In the present process, when the control program is installed in the printer 30, a process of automatically installing the latest printer driver 44d adaptable to the control program on the host computer 10 side is carried out. The present process is carried out based on the version management program 44b.

As shown in the figure, it is determined whether the control program is installed or not (S31). When the control program is determined to be installed, the following processes are carried out (S32 to S34). More specifically, the version of the latest printer driver adaptable to the control program is determined (S32). Then, it is decided whether the latest version of the printer driver operatively adaptable to the control program installed in the printer 30 has already been installed in all the host computers utilizing the printer 30 through the network 50 (S33). If there is at least one host computer to which the latest version of the printer driver is not installed, the latest printer driver adaptable to the control program is installed to the host computer without the latest printer driver (S34). In this embodiment, the printer driver with the latest version is stored in the data storage 37. The same printer driver however may be downloaded from a predetermined Web site each time, or may be installed from an information recording medium such as a floppy disk, a CD-ROM or the like. Moreover, a message indicating to promote the installation of the latest printer driver may be sent to each host computer instead of the installation of the latest printer driver. If the latest version has already been installed in all of the host computers, the step S33 is skipped and the processing ends. The installation of the control program to the host computer 10 may be monitored. Thus when the installation of the control program is detected, the latest printer driver adaptable thereto may be installed in the printer 30.

As described above, in the print system according to the present embodiment, the version up of the control program and the printer driver can be carried out automatically. Consequently, it is possible to rapidly cope with drawbacks such as defective printing or the like caused by non-conformity among a plurality of software programs, and furthermore the extended function and performance can be used effectively. Moreover, the version up is carried out automatically. Therefore, a complicated work for the user can be eliminated to reduce user's burden.

While the examples for the control program and the printer driver have been described in the above-mentioned embodiment, these software programs are not restricted thereto. In the case in which there are other software programs having functionally close relations between the printer and the host computer, information indicative of adaptability between the software programs may be provided and the adaptability may be decided to update the software programs. Consequently, the present embodiment can be applied to other kinds of software programs in the same manner.

Although in this embodiment the version management program 44b is provided on the printer 30 side, a program having the same function as that of the version management program 44b may be provided on the host computer 10 side. By causing the controller 11 of the host computer 10 to execute the program, the same operation control can be carried out in the host computer 10. Moreover, the version management program 44b may be provided on a printer server when the print server is provided on a network as a print job management terminal.

In the print system, the related software programs are subjected to version up at the same time between the printer and the host computer which are stationarily connected to the network, and therefore inconsistency is not generated between the software programs. In some cases, however, inconsistency could be caused when the host computer is temporarily connected to the network for use or when the host computer is exchanged. In order to solve this problem, in a job or a protocol with which the printer driver of the host computer or the like accesses to the printer, an identification number for identifying the software program and a version of the software program may be included. When the printer receives information about the identification number and the version from the host computer, the adaptability between the software programs is decided. If the software programs are not adaptable, a notification indicative of the non-adaptability to the host computer is given, or access rejection may be carried out (in other words, rejecting receipt of a print job transmitted from the host computer). Thus, the printer can previously decide the generation of the inconsistency based on the information about the identification number and version of the software program. A notification indicative of the software program non-adaptability to the host computer to which the print job is sent can be provided, and the access from the host computer can be inhibited. Thus, the generation of the drawbacks can be previously prevented due to the inconsistency.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A management device for managing a print system comprising a data processor connected to a network and a printer for executing a print job sent from the data processor via the network, the data processor having a first software program which is installed therein, and the printer having a second software program which is installed therein, the device comprising:

a determining controller for determining adaptability between an old version of the first software program that has already been installed and a new version of the second software program, or for determining adaptability between an old version of the second software program that has already been installed and a new version of the first software program, where the first software program is of a type different than the second software program; and an updating controller for executing a predetermined process to update the first and the second software programs on the data processor and the printer based on the determination result by the determining controller, wherein when the determining controller determines that there is no adaptability between the new version of the first software program and the old version of the second software program, the updating controller updates the second software program and then updates the first software program, and when the determining controller determines that there is no adaptability between the new version of the second software program and the old version of the first software program, the updating controller updates the first software program and then updates the second software program.

2. The management device according claim 1, wherein the updating controller controls execution and prohibition of update of the first and the second software programs based on the determination result by the determining controller.

3. The management device according to claim 2, wherein when the determining controller determines that the new version of the first software program is not adaptable to neither of the new version of the second software program and the old version of the second software program, the updating controller prohibits the first software program already installed from being updated.

4. The management device according to claim 2, wherein when the determining controller determines that the new version of the second software program is not adaptable to neither the new version or the old version of the first software program, the updating controller prohibits the second software program already installed from being updated.

5. The management device according to claim 1, wherein the updating controller sends a message which prompts update of the first and the second software programs to the data processor to display the message, based on the determination result by the determining controller.

6. The management device according to claim 1, further comprising a memory for storing information about the adaptability between new version and old version for the first software program and the second software program, wherein the determining controller downloads the information about the adaptability via the network into the memory to determine the adaptability based on the downloaded information.

7. The management device according to claim 1, wherein the management device is incorporated in the printer.

8. The management device according to claim 7, wherein the updating controller receives information about the version of the first software program installed in the data processor, as well as the print job sent from the data processor, and executes said predetermined process based on the received information about the version.

9. The management device according to claim 1, wherein when the other data processor is connected to the network, the updating controller also executes the predetermined process to the other data processor.

10. The management device according to claim 1, wherein the first software program controls the data processor to generate a print job corresponding to the printer, and the second software program controls the printer to execute the print job generated by the first software program.

11. A management device for managing a print system comprising a data processor and a printer for executing a print job sent from the data processor, the data processor having a first software program installed therein, the printer having a second software program installed therein, and the device being capable of being connected to a network, comprising:

a determining controller for determining adaptability between an old version of the first software program that has already been installed and a new version of the second software program, or for determining adaptability between an old version of the second software program that has already been installed and a new version of the first software program, where the first software program is of a type different than the second software program, based on adaptability information obtained via the network; and an updating controller for executing a predetermined process to update the installed first software program and the installed second software program based on the determination result by the determining controller, wherein when the determining controller determines that there is no adaptability between the new version of the first software program and the old version of the second software program, the updating controller updates the installed second software program and then updates the installed first software program, and when the determining controller determines that there is no adaptability between the new version of the second software program and the old version of the first software program, the updating controller updates the first software program and then updates the second software program.

12. The management device according to claim 11, wherein the updating controller controls execution and prohibition of update of the first and the second software programs based on the determination result by the determining controller.

13. The management device according to claim 12, wherein when the determining controller determines that the new version of the first software is not adaptable to neither the new version nor the old version of the second software program, the updating controller prohibits the first software program already installed from being updated.

14. The management device according to claim 12, wherein when the determining controller determines that the new version of the second software program is not adaptable to neither of the new version of the first software program and the old version of the first software, the updating controller prohibits the second software program already installed from being updated.

15. The management device according to claim 11, wherein the updating controller sends a message which prompts update of the first and the second software programs to the data processor to display the message based on the determination result by the determining controller.

16. The management device according to claim 11, wherein the network from which the adaptability information is obtained is a wide area network, and the data processor and the printer are connected to a local area network.

17. The management device according to claim 11, further comprising
an activating controller for accessing periodically a WEB site on which the latest version of the first and the second software programs are registered, determining whether or not the first and the second software programs registered on the WEB site are updated, and activating the determining controller and the updating controller when the first and second software programs are determined to be updated.

18. The management device according to claim 17, wherein the updating controller downloads the first and the second software programs from the WEB site into the printer.

19. A management method for managing a print system comprising a data processor connected to a network and a printer for executing a print job sent from the data processor via the network, the data processor having a first software program which is installed therein, and the printer having a second software program which is installed therein, the method comprising:
deciding adaptability between old version of the first software program that has already been installed and a new version of the second software program, or adaptability between an old version of the second software program that has already been installed and a new version of the first software program, where the first software program is of a type different than the second software program; and
updating the first and the second software programs on the data processor and the printer by executing a predetermined process to update, based on the determination result, wherein
when it is determined that there is no adaptability between the new version of the first software program and the old version of the second software program, the installed second software program is first updated and then the installed first software program is updated, and
when it is determined that there is no adaptability between the new version of the second software program and the old version of the first software program, the first software program is first updated and then the second software program is updated.

20. The management method according to claim 19, wherein the updating comprises controlling execution and prohibition of update of the first and the second software programs based on the determination result.

21. The management method according to claim 19, wherein the updating comprises sending a message which prompts update of the first and the second software programs to the data processor to display the message, based on the determination result.

22. The management method according to claim 19, wherein the determining comprises downloading the information about the adaptability via the network into a memory and determining the adaptability based on the downloaded information.

23. The management method according to claim 19, wherein the first software program controls the data processor to generate a print job corresponding to the printer, and the second software program controls the printer to execute the print job generated by the first software program.

24. A management method for managing a print system comprising a data processor and a printer for executing a print job sent from the data processor, the data processor having a first software program installed therein, and the printer having a second software program installed therein, the method comprising:
deciding adaptability between old version of the first software program that has already been installed and a new version of the second software program, or between an old version of the second software program that has already been installed and a new version of the first software program, based on adaptability information, the adaptability information being obtained via a wide area network, where the first software program is of a type different than the second software program; and
updating the installed first software program and the installed second software program by executing a predetermined process to update based on the determination result, wherein
when it is determined that there is no adaptability between the new version of the first software program and the old version of the second software program, the installed second software program is first updated and then the installed first software program is updated, and
when it is determined that there is no adaptability between the new version of the second software program and the old version of the first software program, the first software program is first updated and then the second software program is updated.

25. The management method according to claim 24, wherein the updating comprises controlling execution and prohibition of update of the first and the second software programs based on the determination result.

26. The management method according to claim 24, wherein the updating comprises sending a message which prompts update of the first and the second software programs to the data processor to display the message based on the determination result.

27. The management method according to claim 24, further comprising:
accessing periodically a WEB site on which the latest version of the first and the second software programs are registered;
deciding whether or not the first and the second software programs registered on the WEB site are updated; and
activating the determining controller and the updating controller when the first and second software programs are determined to be updated.

28. A computer readable medium storing a computer program product for managing a print system comprising a data processor connected to a network and a printer for executing a print job sent from the data processor via the network, the data processor having a first software program which is installed therein, and the printer having a second software program which is installed therein, the computer program product comprising:
a deciding control for determining adaptability between old version of the first software program that has already been installed and a new version of the second software program, or for determining adaptability between an old version of the second software program that has already been installed and a new version of the first software program, where the first software program is of a type different than the second software program; and an updating control for updating the first and the second software programs on the data processor and the printer by executing a predetermined process to update, based on the determination result by the determining control, wherein when the deciding control determines that there is no adaptability between the new version of the first software program and the old version of the second software program, the updating control updates the installed second software program and then updates the installed first software program, and when the deciding control determines that there is no adaptability between the new version of the second software program and the old version of the first software program, the updating control updates the first software program and then updates the second software program.

29. The computer program product according to claim 28, wherein the updating control controls execution and prohibition of update of the first and the second software programs based on the determination result by the determining control.

30. The computer program product according to claim 28, wherein the updating control sends a message which prompts update of the first and the second software programs to the data processor to display the message, based on the determination result by the determining control.

31. The computer program product according to claim 28, wherein the determining control downloads the information about the adaptability via the network into a memory and determines the adaptability based on the downloaded on information.

32. The computer program product according to claim 28, wherein the first software program controls the data processor to generate a print job corresponding to the printer, and the second software program controls the printer to execute the print job generated by the first software program.

33. A computer readable medium storing a computer program product for managing a print system comprising a data processor and a printer for executing a print job sent from the data processor, the data processor having a first software program installed therein, and the printer having a second software program installed therein, the computer program product comprising:

a deciding control for determining adaptability between an old version of the first software program that has already been installed and a new version of the second software program, or for determining adaptability between an old version of the second software program that has already been installed and a new version of the first software program, where the first software program is of a type different than the second software program, based on adaptability information, the adaptability information being obtained via a wide area network; and an updating control for updating the installed first software program and the installed second software program by executing a predetermined process to update based on the determination result by the determining control, wherein when the deciding control determines that there is no adaptability between the new version of the first software program and the old version of the second software program, the updating control updates the installed second software program and then updates the installed first software program, and when the deciding control determines that there is no adaptability between the new version of the second software program and the old version of the first software program, the updating control updates the first software program and then updates the second software program.

34. The computer program product according to claim 33, wherein the updating control controls execution and prohibition of update of the first and the second software programs based on the determination result by the determining control.

35. The computer program product according to claim 33, wherein the updating control sends a message which prompts update of the first and the second software programs to the data processor to display the message based on the determination result by the determining control.

36. The computer program product according to claim 33, further comprising activating control for accessing periodically a WEB site on which the latest version of the first and the second software programs are registered, determining whether or not the first and the second software programs registered on the WEB site are updated, and activating the determining controller and the updating controller when the first and second software programs are determined to be updated.

37. A management device for managing a print system comprising a data processor connected to a network and a printer for executing a print job sent from the data processor via the network, the data processor having a first software program installed therein, and the printer having a second software program installed therein, the device comprising:

a detecting controller for detecting whether or not the first and second software programs installed is updated;

a determining controller for determining adaptability between an old version of the first software program that has already been installed and a new version of the second software program, or for determining adaptability between an old version of the second software program that has already been installed and a new version of the first software program, where the first software program is of a type different than the second software program in response to the detecting result by the detecting controller; and an updating controller for executing a predetermined process to update the software program installed in the other of the data processor and the printer, wherein when the determining controller determines that there is no adaptability between the new version of the first software program and the old version of the second software program, the updating controller updates the installed second software program and then updates the installed first software program, and when the determining controller determines that there is no adaptability between the new version of the second software program and the old version of the first software program, the updating controller updates the first software program and then updates the second software program.

38. The management device according to claim 37, wherein when the determining controller determines that there is no adaptability, the updating controller sends a message which prompts update of the software program installed in the other of the data processor and the printer to the data processor to display the message.

39. A management method for managing a print system comprising a data processor connected to a network and a printer for executing a print job sent from the data processor via the network, the data processor having a first software program installed therein, and the printer having a second software program installed therein, the method comprising:
- detecting whether or not the first and second software programs installed is updated;
- deciding adaptability between an old version of the first software program that has already been installed and a new version of the second software program, or determining adaptability between an old version of the second software program that has already been installed and a new version of the first software program, where the first software program is of a type different than the second software program, in response to the detecting result; and
- updating the software program installed in the other of the data processor and the printer by executing a predetermined process to update, wherein
- when it is determined that there is no adaptability between the new version of the first software program and the old version of the second software program, the installed second software program is first updated and then the installed first software program is updated, and
- when it is determined that there is no adaptability between the new version of the second software program and the old version of the first software program, the first software program is updated and then the second software program is updated.

40. The management method according to claim 39, wherein the updating comprises sending a message which prompts update of the software program installed in the other of the data processor and the printer to the data processor to display the message, when it is determined that there is no adaptability.

41. A computer readable medium storing a computer program product for managing a print system comprising a data processor connected to a network and a printer for executing a print job sent from the data processor via the network, the data processor having a first software program installed therein, and the printer having a second software program installed therein, the computer program product comprising:
- a detecting control for detecting whether or not the first and second software programs installed is updated;
- a deciding control for determining adaptability between an old version of the first software program that has already been installed and a new version of the second software program, or determining adaptability between an old version of the second software program that has already been installed and a new version of the first software program, where the first software program is of a type different than the second software program, in response to the detecting result by the detecting control; and
- an updating control for executing a predetermined process to update the software program installed in the other of the data processor and the printer, wherein
- when the deciding control determines that there is no adaptability between the new version of the first software program and the old version of the second software program, the updating control updates the installed second software program and then updates the installed first software program, and
- when the deciding control determines that there is no adaptability between the new version of the second software program and the old version of the first software program, the updating control updates the first software program and then updates the second software program.

42. The computer program product according to claim 41, wherein when the determining control determines that there is no adaptability, the updating control sends a message which prompts update of the software program installed in the other of the data processor and the printer to the data processor to display the message.

* * * * *